United States Patent
Jones et al.

(10) Patent No.: US 7,159,028 B1
(45) Date of Patent: *Jan. 2, 2007

(54) METHOD AND APPARATUS USING XML FOR BOTH A PROTOCOL LAYER AND APPLICATION LAYER

(75) Inventors: Mark A. Jones, New Providence, NJ (US); Tony L. Hansen, South Amboy, NJ (US)

(73) Assignee: AT&T Corp., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/131,745

(22) Filed: May 18, 2005

Related U.S. Application Data (63) Continuation of application No. 09/800,767, filed on Mar. 8, 2001, now Pat. No. 7,099,950.

(60) Provisional application No. 60/188,992, filed on Mar. 13, 2000.

(51) Int. Cl.
*G06F 13/42* (2006.01)

(52) U.S. Cl. ............... 709/230; 709/227; 709/228; 709/232; 709/246; 709/203; 704/275

(58) Field of Classification Search ............... None
See application file for complete search history.

(56) References Cited

U.S. PATENT DOCUMENTS 6,490,564 B1   12/2002   Dodrill et al.
6,665,731 B1   12/2003   Kumar et al.
6,772,216 B1   8/2004    Ankireddipally et al.

OTHER PUBLICATIONS

Jones, Mark, "The MASP XML Protocol," http://lists.w3.org/Archives/Public/xml-dist-app/2000May/0003.html (May 3, 2000).

Jones, Mark A, et al., "Using XML in the MASP Client-Server Protocol," http://www.research.att.com/jones/www9paper.htm, pp. 1-13 (Feb. 20, 2001).

Petrou, C., et al., "An XML-based, 3-tier Scheme for integrating Heterogenous Information Sources to the WWW," *Proceedings of Tenth International Workshop on Database and Expert Systems Applications*, 1999, pp. 706-710.

*Primary Examiner*—B. James Peikari (57) ABSTRACT

A method and system for using XML for both a protocol layer and application data are described. The method comprises the steps of initiating a connection by a client to a server to form a session, responding by said server to said client indicating that said connection has been successfully completed, submitting a request by said client to said server for service, responding by said server to said client by providing said service and terminating the connection by said client. A session is maintained and a plurality of requests for service by a client and a server responds to those requests by providing the requested service or an error message. The session is maintained until all requests made by a client have been serviced and the requests made by a client may be either synchronous or asynchronous. The system comprises a client and a server coupled to said client by a communications link.

16 Claims, 4 Drawing Sheets

Requests that reference objects:

| | |
|---|---|
| `<search>` | retrieve the attribute values for a set of objects that satisfy a filter |
| `<retrieve>` | retrieve the attribute values for a specified resultset |
| `<delete>` | delete the objects that satisfy a filter |
| `<modify>` | change the attribute values for the objects that satisfy a filter |
| `<count>` | count the number of the objects that satisfy a filter |
| `<create>` | create a new object (in one substore) and expose it to the rest of the stores |
| `<expose>` | expose an already created object to the rest of the stores |

Administrative requests:

| | |
|---|---|
| `<auth>` | client turn in an authentication sequence |
| `<list/>` | list server data of various kinds |
| `<help/>` | return usage information |

FIG. 3

General Error Response:

`<error-response>` return an error from the corresponding request

Responses to requests that reference objects:

`<search-response>` return a resultset containing the attributes
`<retrieve-response>` return a resultest containing the attributes
`<delete-response>` return a resultset with the deleted object ids
`<modify-response>` return a resultset for the modified objects
`<count-response/>` return the number of objects that satisfied the filter
`<create-response>` return a resultset with the new object
`<expose-response>` return a resultset with the exposed objects

Administrative request responses:

`<auth-response>` server response in an authentication protocol
`<list-response>` server data that was requested
`<help-response>` usage information

FIG. 4

METHOD AND APPARATUS USING XML FOR BOTH A PROTOCOL LAYER AND APPLICATION LAYER

RELATED APPLICATIONS

This is a continuation of U.S. application Ser. No. 09/800,767, filed Mar. 8, 2001 now U.S. Pat. No. 7,099,950, which, along with the present continuation, claims priority to U.S. Provisional No. 60/188,992 filed Mar. 13, 2000, both of which are incorporated by reference.

FIELD OF THE INVENTION

The present invention relates generally to client-server communications and specifically to use of an eXtensible Markup Language (XML)-based protocol.

BACKGROUND

There have been a number of attempts to fashion XML client-server protocols in place of traditional ASCII protocols. The strength of ASCII protocols for network services such as SMTP, NNTP, and IMAP, is their relative simplicity. Debugging new implementations of such protocols is straightforward. It is convenient to be able to telnet to the appropriate port and manually enter commands to test the service or to "truss" the client or server and monitor the readable communication. "truss" is a Unix command that permits a user to "see" all system calls made by a process, the parameters passed by those calls and any data or errors returned from those calls. That is, a user can "see" what their processes are "asking" Unix to do and the results of those requests, making the "truss" command a very powerful debugging tool. On the other hand, an undesirable hallmark of these legacy protocols is the invention of ad hoc syntaxes to specify requests and replies. This is particularly observed in their conventions for quoting meta-characters, dealing with for example line continuations, encoding binary data and handling error conditions.

SUMMARY OF THE INVENTION

The present invention was the result of a need for an application client to communicate with a database server in a session-oriented protocol. It was recognized that XML could be used to represent both the protocol layer and the application data. The simplicity of an ASCII/Unicode protocol is retained, while the above issues are resolved by a set of XML conventions and extensions for protocols. The core benefits of MASP and its implementation would carry over to the design of many client-server protocols.

MASP (Mediated Attribute Store Protocol) is comparable in form to synchronous, ASCII client-server protocols such as FTP, SMTP, NNTP, POP3 and IMAP. The syntax for each of these Internet protocols, however, is idiosyncratic and differs from the syntax of the payload. For example, SMTP/POP3 commands differ in format from the RFC-822 representation of the e-mail message payloads which they deliver/retrieve. The "dot-stuffing" operation even requires that the payload lines be altered to prevent confusion with the payload delimiter (a line with a single "." on it).

XML (Extensible Markup Language 1.0) has become the predominant representation language for Internet application data. By using an XML representation for the protocol as well as the embedded application data, MASP makes it easy to process both protocol and payload using a single parsing mechanism—an XML parser. Since XML parser implementations are ubiquitous across programming languages and platforms, the client and server protocol interfaces are almost universally adaptable. The protocol can also make full use of XML facilities for comments, XML namespaces, XML schema, the Unicode document character set, UTF-8 and UTF-16 character encoding forms, escaping conventions (e.g., CDATA). Traditional Internet protocols are not extensible for arbitrary comments and are restricted to ASCII encodings.

MASP is a session-oriented XML protocol. A session is represented by a pair of connections—a client-to-server connection that carries an ongoing XML document with client requests and a server-to-client connection that carries an ongoing XML document with server responses. The XML documents contain MASP commands that encompass payload data. There is no necessary connection between the MASP commands and the payload data and any particular conventions for programming language constructs, method calls, objects, data types, etc. This contrasts with other efforts such as XML-RPC to provide RPC (Remote Procedure Call) or SOAP (Simple Object Access Protocol) to provide object access in single-message-exchange (non-session-oriented) protocols.

It is, therefore, an object of the present invention to use XML as the underlying uniform language in a protocol stack. That is, to use a uniform language for both the session protocol (above socket connection) and for the data.

It is a further object of the present invention to develop a system in which the protocol is platform independent.

DESCRIPTION OF THE DRAWINGS

The invention is best described with reference to the detailed description and the following figures, where.

DETAILED DESCRIPTION OF THE PREFERRED EMBODIMENTS

Figure 1:
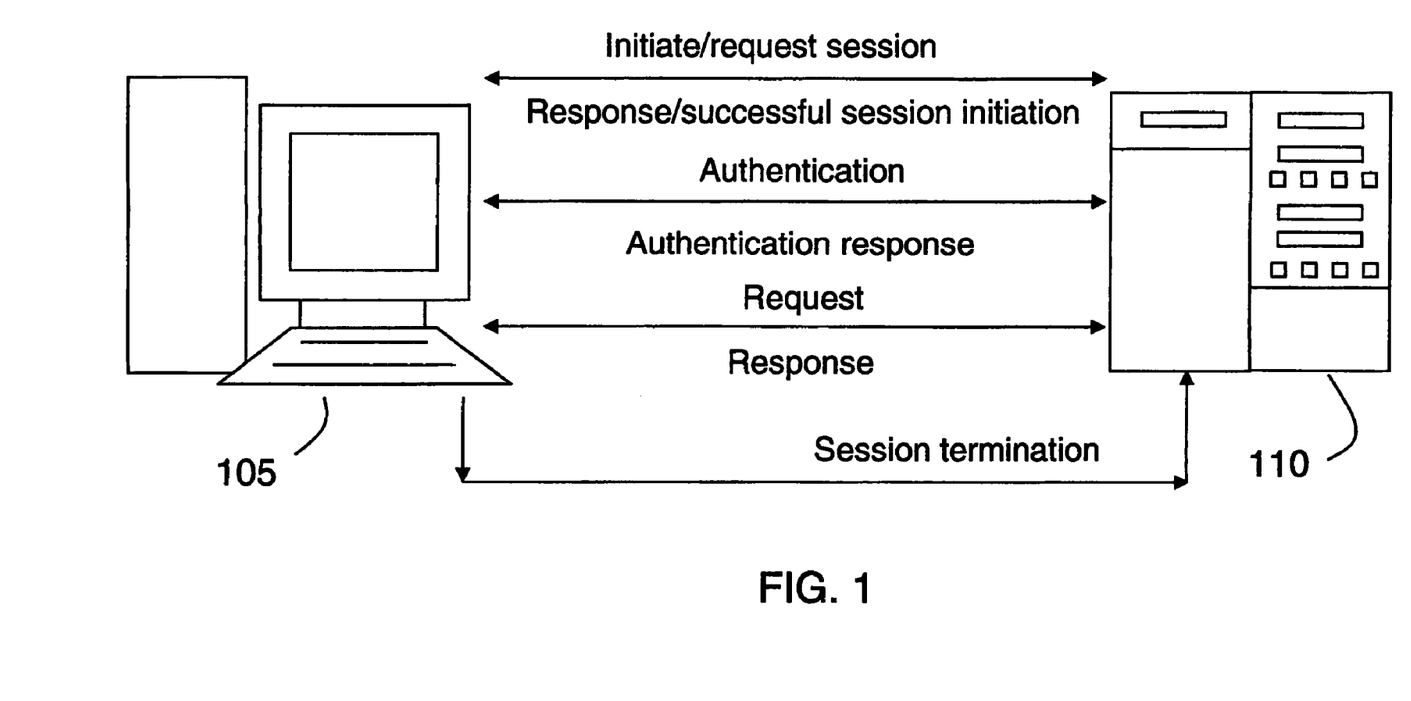
FIG. 1 depicts a block diagram of a simplified client-server arrangement where authentication occurs separately.

The present invention centers on a common or uniform form of client-server protocols—client requests with synchronous server responses. Further extensions of the ideas presented here will be required to handle, for example, more advanced protocols that allow asynchronous operations and incremental result reporting. Referring to FIG. 1, in which a client 105 communicates with a server 110, the important states in a synchronous client-server protocol are shown on FIG. 1 and include:

1. the initiation and successful completion of a connection from the client to the server to form a session 2. any necessary authentication and/or authorization credentials for subsequent services (some protocols may permit this action again at later times)

Figure 2:
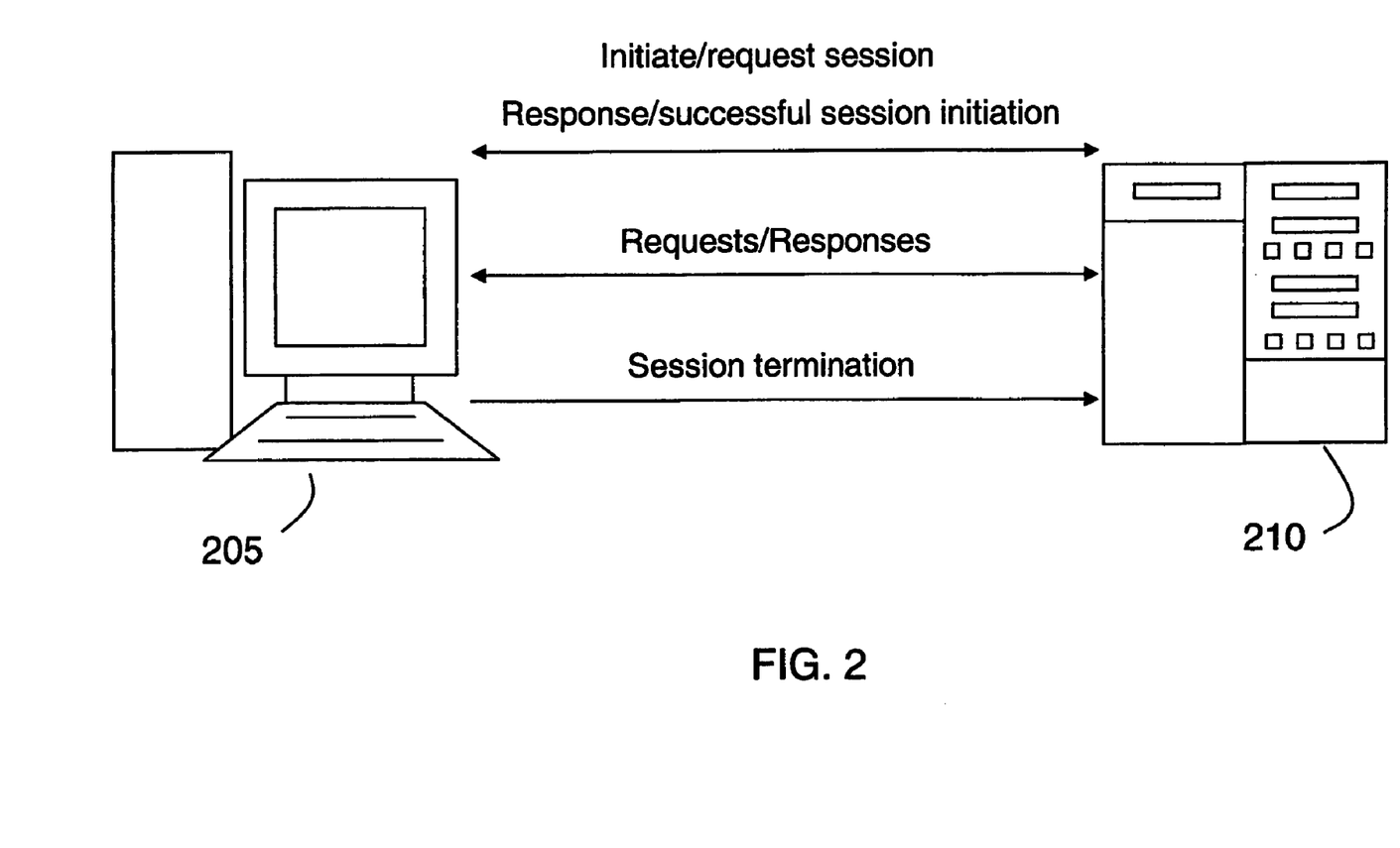
FIG. 2 is a simplified block diagram where authentication is a form of request/response.

3. the repeated submission of a request for service from the client, and a response from the server; such responses may also signal an error condition rather than an expected reply 4. the termination of the session and the connection between the client and the server By viewing the security exchanges as simply another type of request the above flow and exchanges can be significantly simplified as depicted in FIG. 2, in which a client 205 communicates with a server 210. In most applications, authentication will have to be performed in advance of other operations that depend on it, but this is similar to other types of protocol dependencies in which some operations need to be performed in advance of others. This logic is left to application-specific state machines and is not regarded as a syntactic protocol feature. That is, the authentication request and response are treated as a specific type of request and response. There may be certain other types of requests and responses that can, in fact, be handled or transacted prior to an authentication process. The simplified view of the synchronous client-server states are also shown in FIG. 2 and are as follows:

1. the initiation and successful completion of a connection from the client to the server to form a session 2. the repeated submission of a request for service from the client, and a response from the server; such responses may also signal an error condition rather than an expected reply 3. the termination of the session and the connection between the client and the server The implementation of the first step begins with instantiable code that exists in every systems programming language to create an appropriate socket connection. Once the connection is made, a session is created by having each side initiate an XML document. The client application can write XML directly to an opened socket connection or can use a library of functions (requests). The ongoing documents consisting of sequential requests and responses are incrementally interpreted and processed using an XML parser. The protocol and data (payload) are uniformly constructed in XML. No other base protocol is required save for TCP/IP. An augmented version of XML with meta-tags has been developed. The parser integrates the meta-tags with the application. Once such extremely useful meta-tag is EDATA, which stands for encoded data. This tag is used to handle binary data so the application will send and receive a string of bytes as CDATA or character data.

On each side of the connection, the XML documents are processed by a standard XML parser. A currently available non-validating XML parser is "expat XML Parser Toolkit", which was adapted for both the server and a C/C++ client library implementation. A validating XML parser can also be implemented and used. The client to server Document Type Definition (DTD or dtd) and server to client DTD are illustrated and described below. An attendant advantage in using DTDs is formal descriptions of the client and the server documents serve to describe both the protocol and the application data. This is useful in terms of validating the complete client-server interaction, for documentation, for error-recovery etc.

From the client side, the protocol document begins:

```
<?xml version="1.0"?>
<!DOCTYPE masp SYSTEM "client-server.dtd">
<client-Session>
```

The first line specifies the version of XML being used. The second line has the document type declaration to define constraints on the logical structure and to support the use of predefined storage units. The second line also has the address (url reference) of the dtd for the document. An exemplary client-server dtd is shown in Table 1.

From the server side, the protocol document begins:

```
<?xml version="1.0"?>
<!DOCTYPE masp SYSTEM "server-client.dtd">
<!-- Enter <client-session> or <help!>. -->
<server-session>
```

The first line specifies the version of XML being used. The second line has the document type declaration to define constraints on the logical structure and to support the use of predefined storage units. The second line also has the address (url reference) of the dtd for the document. An exemplary server-client dtd is shown in Table 2.

The <client-session> and <server-session> tags are the root elements of the corresponding session documents. Closing a session simply amounts to terminating the client and server documents with the appropriate </client-session> and </server-session> end tags, respectively.

Optional attributes for the <client-session> could include client-host identification and other information that is global to the session. The <server-session> tag could similarly contain important status information regarding the server.

The dynamically generated protocol documents following the root element start tags consists of XML markup for client requests in the <client-session> document and the server responses in the <server-session> document. Although arbitrary markup can represent the requests and responses, the following conventions have been found to be valuable:

1. Each client request tag such as <search> is paired with either a server response tag such as <search-response> or by an <error-response> tag.

2. Each client request tag includes a unique id attribute, which is also carried in the corresponding server response. The id provides greater security in associating responses, even in a synchronous protocol.

3. The XML mechanism of "CDATA sections" or the EDATA tag must be used inside any element, which contains arbitrary character data that includes characters that are special to XML such as ampersand (&), less-than (<), and greater-than (>). By using XML as the basis for encoding requests and responses, and XML-based protocol can inherit the native XML facilities for delimiting and escaping and thus, avoid introducing ad hoc techniques.

The use of the id attribute is within the spirit of its usage in XML. Even though it is not directly XLinked by the server response, it is nonetheless intended as a pointer to content (a request) within the client document. The protocol handlers enforce the correspondence between the id's of the client and server documents.

Figure 3:
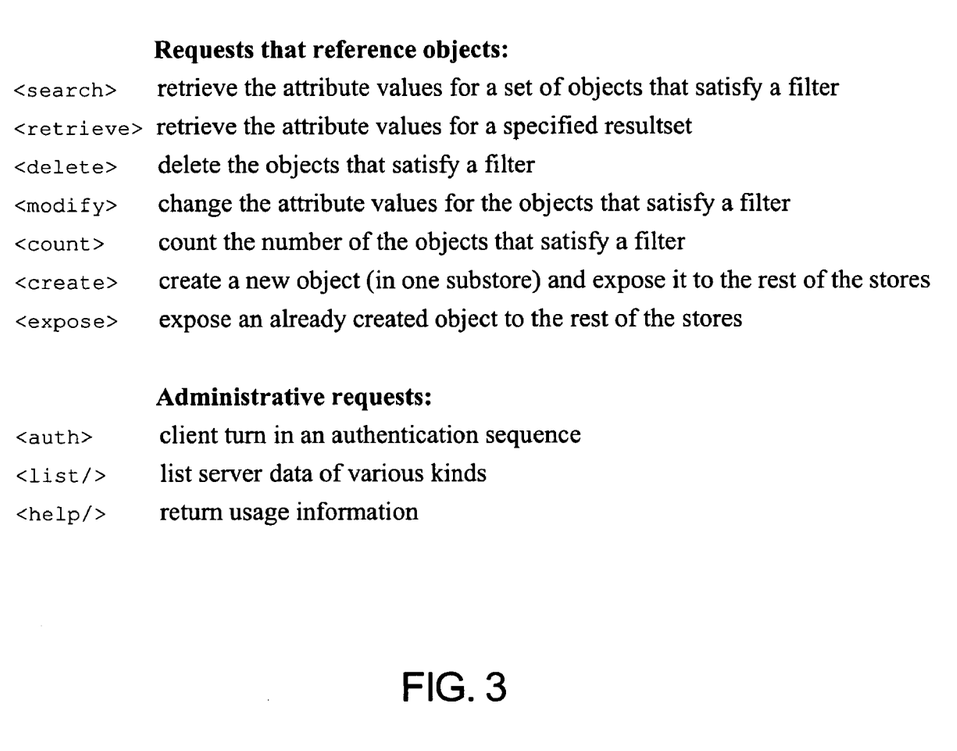
FIG. 3 summarizes the elements that form client-generated requests for service.
Figure 4:
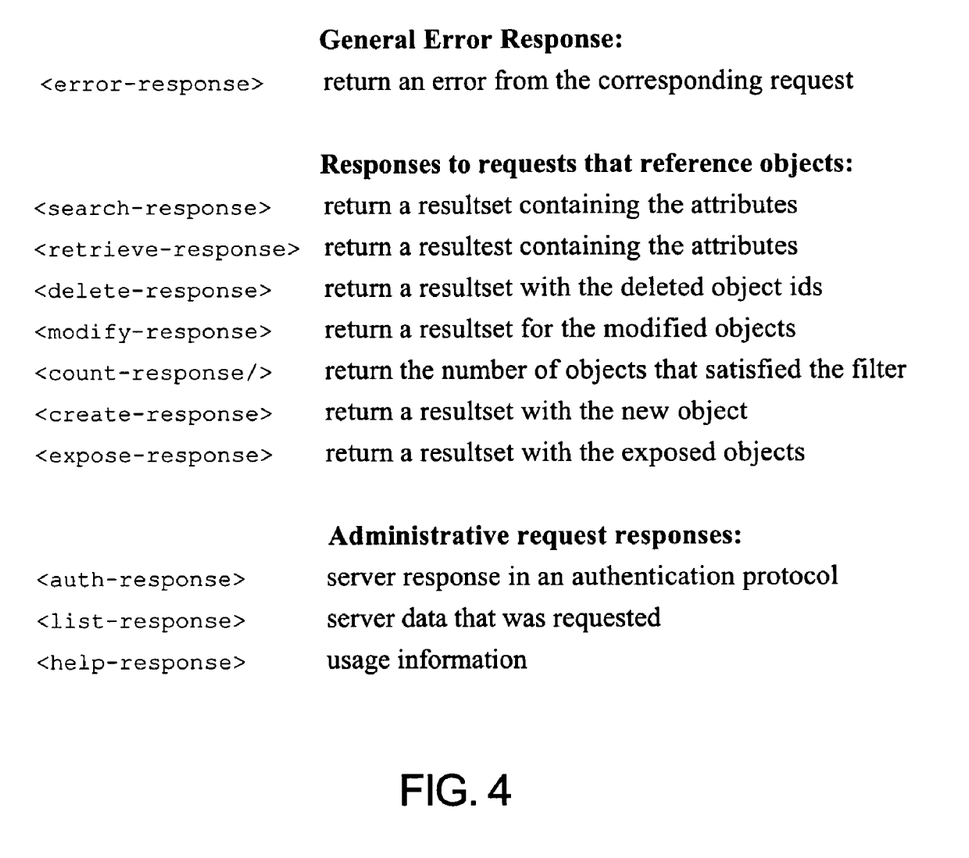
FIG. 4 summarizes the corresponding server-generated response elements.

FIG. 3 summarizes the elements that form client-generated requests for service. FIG. 4 summarizes the corresponding server-generated response elements. The following is an example of a client search request and a successful server response:

```
<!-- client request -->
<search id='1'>
    <typedecl>user$u</typedecl>
    <filter><![CDATA[(last_name[$u]='Burnes')]]></filter>
    <select name='full_name[$u]'/>
    <select name='email[$u]'/>
```

-continued

```
</search>
<!-- server response -->
<search-response id='1'>
    
        <typedecl>user$u</typedecl>

<result>
            <ids>
                <id><EDATA encoding='qp'>hermod0000000102=
</EDATA></id>
            </ids>
            <attrvals>
                <val ix='0' name='full_name[$u]'><EDATA
encoding='qp'>Susan Burnes=
</EDATA></val>
                <val ix='1' name='email[$u]'><EDATA
encoding='qp' >susan=40troy.research.att.com=
</EDATA></val>
            </attrvals>
        </result>
        <result>
            <ids>
                <id><EDATA encoding='qp'>hermod0000000324=
</EDATA></id>
            </ids>
            <attrvals>
                <val ix='0'><EDATA encoding='qp'>Walter Burnes=
</EDATA></val>
                <val ix='1'><EDATA
encoding='qp' >walt=40troy.research.att.com=
</EDATA></val>
            </attrvals>
        </result>

</search-response>
```

In the above example, the client is required to specify an identifier of the search, which is echoed by the server in its response. This is used as a means to keep track of requests and their associated responses. Character data is any string of characters that does not contain the start delimiters or the closing or end delimiters or any mark-up characters. The start of the character data is indicated by "<![cDATA", the character data follows, the end of the character data is indicated by "]]>". "attrvals" defines the attribute values and "nmtoken" defines a name token, which can be any mixture of name characters. "qp" stands for "quotable printable" and sets up line wrap at column 76.

Although there is no transaction management per se in MASP, some activities may require multiple client-server exchanges. For example, MASP uses the Simple Authentication and Security Layer (SASL) authentication mechanism, which permits complex multi-turn protocols. SASL is a method for adding authentication support to connection-based protocols. To authenticate a user (client) to a server there needs to be a command in the protocol to perform the authentication function. Options may include the ability to negotiate protection of subsequent interactions. Below is an example of a multi-turn SASL SCRAM-MD5 exchange:

```
<!-- client request, turn 1 -->
<auth id="1">
    <sasl method="SCRAM-MD5"><EDATA
encoding="base64">sh . . . 89ef</EDATA></sasl>
</auth>
<!-- server response, turn 1 -->
<auth_response id="1">
    <sasl state="continue"><EDATA
encoding="base64">d34 . . . dk355</EDATA></sasl>
```

-continued

```
</auth-response>
<!-- client request, turn 2 -->
<auth id=previd="1">
    <sasl><EDATA encoding="base64">lko9 . . . wek03</EDATA></sasl>
</auth>
<!-- server response, turn 2 -->
<auth_response id="2">
    <sasl state="ok"></sasl>
</auth-response>
```

A major task in many protocols, including MASP, is the marshalling of data between the endpoints. MASP includes a number of contexts such as the SASL payloads in the previous section in which relatively unrestricted byte sequences are to be transmitted. Other contexts contain more conventional character data, but may contain special XML characters such as "&". The XML CDATA mechanism is often useful for such cases, but it may not be guaranteed that the CDATA terminator ]]> does not appear in a subsequence.

MASP provides a meta-tag, <EDATA>, that can be incorporated wherever arbitrary byte sequences need to appear. The processing of EDATA has been integrated directly into our XML parsers so that the data is decoded and spliced into the character stream exactly as other forms of PCDATA. The encoding attribute specifies the type of encoding provided. The implementation in the present invention currently supports base64, quoted-printable, "url" and "hex" encodings, and it can be easily extended to others. "base64" is an encoding scheme for Multipurpose Internet Mail Extensions (MIME), which encodes files and data as byte strings.

XML is well known for its verbosity. This property may serve it well when the goal is a readable, self-contained description for human consumption. In a protocol, however, it is not an advantage to consume far more bandwidth than necessary. There is a certain amount of obligatory overhead for packaging a structured data payload, and XML's syntactic overhead has been accepted for this purpose. At the expense of readability on the wire, one can perform data compression on the XML fragments if reducing that type of overhead is a real concern.

There is another kind of verbosity, descriptive repetition, for which MASP provides a solution. In the search example above, the response markup included two results. In the first result, the first appearance of a value for the full_name [$u] attribute was coded as:

```
<val ix='0' name='full_name[$u]'><EDATA encoding='qp'>Susan
Burnes=
</EDATA></val>
```

The attribute is fully described in its first appearance by the name attribute (full_name [$u]) and is also assigned an index (0) via the ix attribute. Subsequent references to this description can be obtained by simply including a reference to a prior ix attribute:

```
<val ix='0'><EDATA encoding='qp'>Walter Burnes=
</EDATA></val>
```

The ix mechanism accomplishes for attributes roughly what the XML id accomplishes for elements, namely the ability to establish co-reference.

Error handling is a major concern in managing protocols. The primary issues are distinguishing various types of errors and error recovery. A large class of errors arises when the server detects an error when processing a syntactically valid request. This may be due to a semantically anomalous request, or a failure of the resources required by the server to carry out the requested operation, or a recoverable error in the server itself. In these cases, the server returns an appropriate <error-response>. For example, if the filter expression in the search example above is malformed:

```
<!-- client request -->
<search id='1'>
    <typedecl >user$u</typedecl>
    <filter>cl[CDATA[(last_name[$u]='Burnes')]]></filter>
    <select name='full_name[$u]'/>
    <select name='email[$u]'/>
</search>
<!-- server response --->
<error-response id='1' permanence='permanent' errorcode='5'>
<[CDATA[Error parsing parse error, column 22: '!'Bur . . . ']]>
</error- response>
```

The permanence attribute indicates whether the error is permanent (not likely to help by simply trying again), or temporary (a resource problem that may later be resolved). The errorcode returns a specific error code that allows the client to take appropriate action. The body of the error response is human-readable text that gives additional information about the error.

Another class of errors arises due to invalid syntax in the client requests. This might occur because of a mistyping by a human, from a buggy client application, or due to communication errors in the network transport. These errors are caught by the server's XML parser. For example, suppose that inside the search request, the <typedecl> had been misspelled as <typedelc>:

```
<!-- client request -->
<search id='1'>
    <typedelc >user$u</typedecl>
    <filter><![CDATA[(last_name[$u]='Burnes')]]></filter>
    <select name='full_name[$u]'/>
    <select name='email[$u]'/>
</search>
<!-- server response -->
<error-response id='1' permanence='permanent' errorcode='12'>
<![CDATA[mismatched tag at line 1]]>
</error-response>
```

With a little cleverness, the server protocol engine is able to recover by resetting the XML parser and initiating the start of a new client document (<client-session>). Other types of errors involve detecting loss of service. A connection loss to the server from a client can be managed by re-tries and starting a new client document. Other situations may require techniques such as timeouts and "keep-alives", which are not currently used.

One non-obvious and serendipitous side effect of using XML as a protocol language is that fact that XML comments can easily be ignored by most XML parsers. Comments may be freely interspersed to provide prompts, help, server or protocol or application-level debugging information and application specific comments. Comments can be observed in socket level debugging tools but are automatically ignored by the XML-parser. This turns out to extremely useful, especially for debugging servers. They can produce debugging information in commented form right along with the normal XML responses without interrupting the normal client behavior. Thus, a tool such as the Unix truss utility can monitor the client or server I/O activity and get a good picture of what is going on even while the server is in "normal" operation. This has been so useful that a debuglevel attribute is utilized on many of the client requests that trigger the server to drop varying degrees of debugging information into the server document in the form of XML comments. This is a feature not readily available in most ad hoc ASCII protocols.

A number of related efforts use XML for carrying application-specific payloads over a non-XML protocol encoding, typically HTTP. For example, the ICE/HTTP variant of the Information and Content Exchange (ICE) Protocol uses the HTTP POST/Response mechanism to transmit XML payloads to support content syndicators and their subscribers.

XML payloads can also directly support programming models. XML-RPC is a specification for remote procedure calling using HTTP as the transport and XML as the encoding. The Simple Object Access Protocol (SOAP) is an Internet draft proposal for making remote method calls on objects. In contrast, MASP uses XML uniformly for protocol and payload. MASP XML payloads are abstract, intentional requests for service, rather like the idea of abstract markup for text processing; they do not necessarily correspond to particular coding constructs in the client or server.

MASP has been described as an XML-based client-server protocol. XML offers a standard set of mechanisms for representing structured data, and there are many high-quality XML parsers that are now available. DTD's (or the XML schemas currently under development by the World Wide Web Consortium (W3C)) present a clear picture of the client and server protocol syntax, and, especially with a validating parser, can enforce very precise syntactic requirements. The MASP extensions and conventions presented herein further form a very useful protocol substrate.

Flexibility in adding or changing a protocol is particularly important when designing new services. This is an area where the XML approach really stands out. It is a very simple matter to modify the DTD's, change a dispatch table in the code, and test a new feature or command; it is certainly much easier than modifying ad hoc parsing code or a Yet Another Compiler Compiler (YACC) grammar. YACC is a meta-language for building compilers used on Unix.

In fact, this flexibility invites software re-use as well. It is intended to make the MASP implementation available to others who want to experiment with XML protocols. Most of the features that are described herein for turn-taking, escaping and encoding mechanisms, error handling, attribute repetition, debugging and session management would be generally useful for many protocols.

TABLE 1

Client-to-Server DTD

<?xml version="1.0" encoding="UTF-8"?>
<!--
This is the client-to-server MASP (Mediated Attribute Store Protocol) dtd.
Representational guidelines:
   * Each request in the session has an 'id' attribute generated
      by the client. The server will attach this 'id' to the
      responses that it generates.
   * Request control options should be handled as attributes.

TABLE 1-continued

Client-to-Server DTD

```
#REQUIRED means that the attribute must be specified for all
elements of the type in the attribute list declaration. "|" means
     *    Request data options should be handled as elements.
-->
<!ELEMENT client-session
          (auth |
           count |
           create |
           delete |
           expose |
           help |
           list |
           modify |
           retrieve |
           search)*>
<!ATTLIST client-session client-host NMTOKEN #IMPLIED>
<!-- authenticate a user
-->
<!ELEMENT auth (sasl)>
<!ATTLIST auth id ID #REQUIRED
               previd ID #IMPLIED
               debuglevel NMTOKEN #IMPLIED>
<!ELEMENT sasl (#PCDATA | EDATA)*>
<!ATTLIST sasl method NMTOKEN #IMPLIED>
<!--     for the tuples that satisfy the filter,
         count the number of tuples
-->
<!ELEMENT count (typedecl, filter)>
<!ATTLIST count id ID #REQUIRED
                debuglevel NMTOKEN #IMPLIED>
<!--     create a new object with the declared type,
         and add the attribute values
-->
<!ELEMENT create (typedecl, filter, mod*, select*)>
<!ATTLIST create id ID #REQUIRED
                 debuglevel NMTOKEN #IMPLIED>
<!--     for the 1-tuples that satisfy the filter
         (over exactly one variable),
         delete the objects
-->
<!ELEMENT delete (typedecl, filter)>
<!ATTLIST delete id ID #REQUIRED
                 debuglevel NMTOKEN #IMPLIED>
<!--     expose a new object with the declared type,
         typeid and attribute values (if any)
-->
<!ELEMENT expose (typedecl, filter, mod*, select*)>
<!ATTLIST expose id ID #REQUIRED
                 debuglevel NMTOKEN #IMPLIED>
<!--     help
-->
<!ELEMENT help EMPTY>
<!ATTLIST help id ID #REQUIRED
               debuglevel NMTOKEN #IMPLIED>
<!--     list
-->
<!ELEMENT list EMPTY>
<!ATTLIST list id ID #REQUIRED
               show (signatures | sasl-mechanisms) #REQUIRED
               debuglevel NMTOKEN #IMPLIED>
<!--     for the tuples that satisfy the filter,
         either add the value    (set union on the attr
                                  values or relation instances),
         or delete the value     (set difference on the attr
                                  values or relation instances),
         or replace the value(s) (replace any existing attr
                                  values or relation instances
                                  with the value)
-->
<!ELEMENT modify (typedecl, filter, mod*, select*)>
<!ATTLIST modify id ID #REQUIRED
                 states (no | yes) "no"
                 debuglevel NMTOKEN #IMPLIED>
<!--     for the tuples in the resultset,
         select attributes
-->
<!ELEMENT retrieve (resultset, select*)>
```

TABLE 1-continued

Client-to-Server DTD

```
<!ATTLIST retrieve id ID #REQUIRED
                   states (no | yes) "no"
                   debuglevel NMTOKEN #IMPLIED>
<!ELEMENT resultset (typedecl, results)>
<!ELEMENT typedecl (#PCDATA | EDATA)*>
<!ELEMENT results (result*)>
<!ATTLIST results count NMTOKEN if REQUIRED>
<!ELEMENT result (ids, states?, attrvals?)>
<!ELEMENT ids (id+)>
<!ELEMENT id (#PCDATA | EDATA)*>
<!ELEMENT states (state*)>
<!ELEMENT state (#PCDATA | EDATA)*>
<!ATTLIST state ix NMTOKEN #IMPLIED
                name CDATA #IMPLIED>
                <!ELEMENT attrvals (val*)>
                <!ATTLIST attrvals ix NMTOKEN #IMPLIED
                                   name CDATA #IMPLIED
<!ELEMENT val (#PCDATA | EDATA)*>
<!--     for the tuples that satisfy tfilter,
         select attributes
-->
<!ELEMENT search (typedecl, filter, select*)>
<!ATTLIST search id ID #REQUIRED
                 states (no | yes) "no"
                 debuglevel NMTOKEN #IMPLIED>
<!--     common elements -->
<!ELEMENT filter (#PCDATA | EDATA)*>
<!ELEMENT select EMPTY>
<!ATTLIST select ix NMTOKEN #IMPLIED
                 name CDATA #IMPLIED>
<!ELEMENT mod (#PCDATA EDATA)*>
<!ATTLIST mod op (add | delete | replace) "add"
              ix NMTOKEN #IMPLIED
              name CDATA #IMPLIED>
<!ELEMENT EDATA (#PCDATA)>
<!ATTLIST EDATA encoding
                (base64 | b64 | quoted-printable | qp | url |
hex)
                #IMPLIED>
```

TABLE 2

Server-to-Client DTD

```
<?xml version="1.0" encoding="UTF-8"?>
<?xml version="1.0" encoding="UTF-8"?>
<!--
This is the dtd for the Hermod Attribute Store
server-to-client communication protocol.
Representational guidelines:
     *    Each response returned from the server contains an 'id'
          that corresponds to the 'id' that the client attached to the
          corresponding request.
     *    Response control options and counts should be handled
as attributes. #REQUIRED means that the attribute must be
specified for all elements of the type in the attribute list
declaration. "|" means "or".
     *    Response data should be handled as elements.
-->
<!ELEMENT server-session
          (auth-response |
           count-response |
           create-response |
           delete-response |
           error-response |
           expose-response |
           help-response |
           list-response |
           modify-response |
           retrieve-response |
           search-response)*>
<!ELEMENT auth-response (sasl)>
<!ATTLIST auth-response id ID #REQUIRED>
<!ELEMENT sasl (#PCDATA | EDATA)*>
```

TABLE 2-continued

Server-to-Client DTD

```
<!ATTLIST sasl state NMTOKEN #REQUIRED>
<!ELEMENT count-response EMPTY>
<!ATTLIST count-response id ID #REQUIRED
                 count NMTOKEN #REQUIRED>
<!ELEMENT create-response (resultset)>
<!ATTLIST create-response id ID #REQUIRED>
<!ELEMENT delete-response (resultset)>
<!ATTLIST delete-response id ID #REQUIRED>
<!ELEMENT error-response (#PCDATA | EDATA)*>
<!ATTLIST error-response id ID #REQUIRED
                 permanence NMTOKEN "permanent">
<!ELEMENT expose-response (resultset)>
<!ATTLIST expose-response id ID #REQUIRED>
<!ELEMENT help-response (#PCDATA | EDATA)*>
<!ATTLIST help-response id ID #REQUIRED>
<!ELEMENT list-response (signatures sasl-mechanisms)>
<!ATTLIST list-response id ID #REQUIRED>
<!ELEMENT signatures (sig)*>
<!ELEMENT sig (#PCDATA | EDATA)*>
<!ELEMENT sasl-mechanisms (mechanism) *>
<!ELEMENT mechanism (#PCDATA | EDATA)*>
<!ELEMENT modify-response (resultset)>
<!ATTLIST modify-response id ID #REQUIRED>
<!ELEMENT retrieve-response (resultset)>
<!ATTLIST retrieve-response id ID #REQUIRED>
<!ELEMENT search-response (resultset)>
<!ATTLIST search-response id ID #REQUIRED>
<!--     common elements -->
<!ELEMENT resultset (typedecl, results)>
<!ELEMENT typedecl (#PCDATA | EDATA)*>
<!ELEMENT results (result*)>
<!ATTLIST results count NMTOKEN #REQUIRED>
<!ELEMENT result (ids, states?, attrvals?)>
<!ELEMENT ids (id+)>
<!ELEMENT id (#PCDATA | EDATA)*>
<!ELEMENT states (state*)>
<!ELEMENT state (#PCDATA | EDATA)*>
<!ATTLIST state ix NMTOKEN #IMPLIED
                 name CDATA #IMPLIED>
<!ELEMENT attrvals (val*)>
<!ATTLIST attrvals ix NMTOKEN #IMPLIED
                 name CDATA #IMPLIED>
<!ELEMENT val (#PCDATA | EDATA)*>
<!ELEMENT EDATA (#PCDATA)>
<!ATTLIST EDATA encoding
                 (base64 | b64 | quoted-printable | qp | url | hex)
                 #IMPLIED>
```

The synchronous XML-based protocol described herein can be extended to provide asynchronous operation. In the context of the present invention, synchronous operation refers to the response by the server being paired directly with requests initiated by the client with ordering preserved. An extension whereby responses by the server are returned in an order different from the order of the requests initiated by the client is possible. The already defined "id" can be used to pair up or match requests with responses. This could be further extended to permit responses to be generated in pieces, where the pieces could be further given serial numbers as well as an "id" number. This may prove useful in the event that the pieces of a response were delivered out of order and required reordering. The "final" piece of a response could be marked as "final" so that the client would know that the response was complete and the response could be reordered if necessary.

The principal advantage of asynchronous operation is to allow multiple commands to be processed in parallel, particularly, when the server is multi-threaded and some requests take longer to process than others. A mechanism may also be required to handle instances where some requests need to be processed before others, in other words instances where there may be a priority or hierarchy for some requests.

It should be clear from the foregoing that the objectives of the invention have been met. While particular embodiments of the present invention have been described and illustrated, it should be noted that the invention is not limited thereto since modifications may be made by persons skilled in the art. The present application contemplates any and all modifications within the spirit and scope of the underlying invention disclosed and claimed herein.

What is claimed is:

1. A method for using XML for both a protocol layer and application data, the protocol layer and application data having an XML-based structure, the method comprising:
   at a client, initiating a connection between the client and a server, by initiating an XML document and writing the XML document directly to a TCP/IP socket connection;
   at the client, requesting that the server perform a service; and
   terminating the connection.

2. The method according to claim 1, wherein the XML document is ongoing and the method further comprises:
   using an XML parser, incrementally interpreting and processing the XML document.

3. The method according to claim 2, further comprising:
   monitoring activity of the client by using XML comments that are ignored by the XML parser.

4. The method according to claim 1, further comprising:
   compressing the XML to reduce overhead.

5. The method according to claim 1, further comprising:
   augmenting the XML to handle descriptive verbosity by forming an index that establishes a co-reference to an attribute that is already fully described.

6. A method for using XML for both a protocol layer and application data, the protocol layer and application data having an XML-based structure, the method comprising:
   at a server, indicating that a connection between the client and the server has been initiated, by initiating an XML document and writing the XML document directly to a TCP/IP socket connection so as to indicate that the connection has been established; and
   at the server, responding to a service request from the client by providing the service.

7. The method according to claim 6, wherein the XML document is ongoing and the method further comprises:
   using an XML parser, incrementally interpreting and processing the XML document.

8. The method according to claim 7, further comprising:
   monitoring activity of the server by using XML comments that are ignored by the XML parser.

9. The method according to claim 6, further comprising:
   compressing the XML to reduce overhead.

10. The method according to claim 6, further comprising:
    augmenting the XML to handle descriptive verbosity by forming an index that establishes a co-reference to an attribute that is already fully described.

11. A client using XML for both a protocol layer and application data, the protocol layer and application data having an XML-based structure, the client comprising:
    means for initiating a connection between the client and a server, by initiating an XML document and writing the XML document directly to a TCP/IP socket connection;
    means for submitting a service request to the server; and
    means for terminating the connection.

12. The client according to claim 11, wherein the XML document is ongoing and the client further comprises:
    means for using an XML parser to incrementally interpret and process the XML document.

13. The client according to claim 12, further comprising:
    means for monitoring activity of the client by using XML comments that are ignored by the XML parser.

14. A server using XML for both a protocol layer and application data, the protocol layer and application data having an XML-based structure, the server comprising:
    means for indicating that a connection between a client and the server has been initiated, by initiating an XML document and writing the XML document directly to a TCP/IP socket connection so as to indicate that the connection has been established;
    means for responding to a service request by providing the service.

15. The server according to claim 14, wherein the XML document is ongoing and the server further comprises:
    means for using an XML parser to incrementally interpret and process the XML document.

16. The server according to claim 15, further comprising:
    means for monitoring activity of the server by using XML comments that are ignored by the XML parser.

* * * * *